United States Patent
Han et al.

(10) Patent No.: US 11,302,995 B2
(45) Date of Patent: Apr. 12, 2022

(54) BUFFERING MEMBER AND BATTERY MODULE

(71) Applicant: JIANGSU CONTEMPORARY AMPEREX TECHNOLOGY LIMITED, Liyang (CN)

(72) Inventors: Ruiqi Han, Liyang (CN); Liangyi Wang, Liyang (CN); Quan Yang, Liyang (CN); Lin Ma, Liyang (CN)

(73) Assignee: JIANGSU CONTEMPORARY AMPEREX TECHNOLOGY LIMITED, Ningde (CN)

( * ) Notice: Subject to any disclaimer, the term of this patent is extended or adjusted under 35 U.S.C. 154(b) by 297 days.

(21) Appl. No.: 16/586,587

(22) Filed: Sep. 27, 2019

(65) Prior Publication Data

US 2021/0028429 A1 Jan. 28, 2021

(30) Foreign Application Priority Data

Jul. 22, 2019 (CN) .......................... 201921154357.X

(51) Int. Cl.
*H01M 6/42* (2006.01)
*H01M 50/463* (2021.01)
(Continued)

(52) U.S. Cl.
CPC ......... *H01M 50/463* (2021.01); *H01M 50/20* (2021.01); *H01M 50/209* (2021.01); *H01M 50/24* (2021.01); *H01M 50/291* (2021.01)

(58) Field of Classification Search
CPC .. H01M 50/463; H01M 50/20; H01M 50/209; H01M 50/24; H01M 50/466;
(Continued)

(56) References Cited

U.S. PATENT DOCUMENTS

| | | |
|---|---|---|
| 4,986,013 A | 1/1991 | Pollack |
| 8,905,670 B1 | 12/2014 | Blakeman |

(Continued)

FOREIGN PATENT DOCUMENTS

| | | |
|---|---|---|
| CA | 2363471 A1 | 5/2003 |
| CN | 206059484 U | 3/2017 |

(Continued)

OTHER PUBLICATIONS

Jiangsu Contemporary Amperex Technology, Limited, Extended European Search Report, EP19196112.7, dated Mar. 4, 2020, 8 pgs.

*Primary Examiner* — Matthew W Van Oudenaren
(74) *Attorney, Agent, or Firm* — Morgan, Lewis & Bockius LLP

(57) ABSTRACT

The present disclosure provides a buffering member and a battery module, the buffering member comprises a first member and a second member. The first member comprises a first main body and a first connecting portion, the second member comprises a second main body and a second connecting portion. The first main body and the second main body face each other, and the first connecting portion is cooperated with and fixedly connected to the second connecting portion. Because the first member and the second member are independent members, and they can be formed by separately cutting a sheet. Because the first member and the second member each are small in size and simple in structure, and they can be rapidly formed by using less material, the whole structure of the buffering member is simple and the buffering member uses less material, thereby maximally improving the utilization rate of the sheet.

9 Claims, 7 Drawing Sheets

(51) Int. Cl.
*H01M 50/20* (2021.01)
*H01M 50/24* (2021.01)
*H01M 50/209* (2021.01)
*H01M 50/291* (2021.01)

(58) Field of Classification Search
CPC ............. H01M 50/469; H01M 50/477; H01M 50/207; H01M 50/202; H01M 50/233; H01M 50/242; H01M 50/262; H01M 50/593; H01M 50/289; H01M 50/291; H01M 50/293; H01M 10/6555
See application file for complete search history.

(56) References Cited

U.S. PATENT DOCUMENTS

2013/0029192 A1* 1/2013 Oya .................... H01M 10/425
                                                         429/61
2016/0211492 A1* 7/2016 Cho ...................... H01M 50/20
2016/0359149 A1* 12/2016 Shao ..................... H01M 50/24

FOREIGN PATENT DOCUMENTS

| CN | 107732073 | 2/2018 |
| CN | 208955062 U | 6/2019 |
| JP | H10195991 A | 7/1998 |
| JP | H11162422 A | 6/1999 |
| KR | 101298232 B1 | 8/2013 |
| KR | 101830868 B1 | 2/2018 |

* cited by examiner

BUFFERING MEMBER AND BATTERY MODULE

CROSS-REFERENCE TO RELATED APPLICATIONS

The present application claims priority to Chinese patent application No. CN201921154357.X, filed on Jul. 22, 2019, which is incorporated herein by reference in its entirety.

FIELD OF THE PRESENT DISCLOSURE

The present disclosure relates to the field of battery technology, and particularly relates to a buffering member and a battery module.

BACKGROUND OF THE PRESENT DISCLOSURE

A battery module typically comprises a plurality of batteries arranged side by side and two end plates respectively positioned at two ends of the plurality of batteries. When assembling the battery module, the two end plates can exert a certain preload toward an inner side of the two end plates to clamp the plurality of batteries.

In the use of the battery module, because the batteries in the battery module generate swelling forces, and the excessive swelling forces may cause the battery module to fall apart. At present, in order to alleviate the effect of the swelling forces of the batteries on the battery module, a buffering pad is usually provided between two adjacent batteries. However, because the conventional buffering pad is generally formed as a rectangular annulus structure in one piece (i.e., the buffering pad is formed by cutting off an intermediate portion of a sheet), and the buffering pad formed by such cutting manner causes the waste of the raw material as high as 50% or more, and sometimes even up to 80%, therefore not only the cost of the buffering pad is increased, but also the resource is greatly wasted.

SUMMARY OF THE PRESENT DISCLOSURE

In view of the problem existing in the background, an object of the present disclosure is to provide a buffering member and a battery module, the structure of the buffering member is simple and the buffering member uses less material, thereby maximally improving the utilization rate of the sheet, therefore the cost is reduced and the resource is saved, when the buffering member is applied to the battery module, the buffering member satisfies the swelling force requirement of the battery, thereby ensuring the service life of the battery.

In order to achieve the above object, the present disclosure provides a buffering member, which comprises a first member and a second member, and the first member and the second member are spliced together and form a hollow frame structure. The first member comprises a first main body and a first connecting portion, and the second member comprises a second main body and a second connecting portion. The first main body of the first member and the second main body of the second member face each other in a second direction, and the first connecting portion is cooperated with and fixedly connected to the second connecting portion.

The first connecting portion protrudes from the first main body in the second direction, the second connecting portion protrudes from the second main body in the second direction, and the first connecting portion and the second connecting portion face each other in a third direction and are fixedly connected to each other.

The first connecting portion abuts against the second main body in the second direction and is fixedly connected to the second main body. The second connecting portion abuts against the first main body in the second direction and is fixedly connected to the first main body.

A width of the first connecting portion in a first direction is equal to a width of the first main body in the first direction, and a width of the second connecting portion in the first direction is equal to a width of the second main body in the first direction.

The first connecting portion protrudes from the first main body in the second direction, and the second connecting portion is recessed from a surface of the second main body facing the first main body in the second direction. The first connecting portion is received in the second connecting portion and fixedly connected to the second connecting portion.

The second main body abuts against the first main body in the second direction and is fixedly connected to the first main body.

Projections of the first connecting portion and the second connecting portion in a third direction each are semicircular; or projections of the first connecting portion and the second connecting portion in the third direction each are triangular; or projections of the first connecting portion and the second connecting portion in the third direction each are trapezoidal.

The first member further comprises a third connecting portion, and the third connecting portion is recessed from a surface of the first main body facing the second main body in the second direction. The second member further comprises a fourth connecting portion, and the fourth connecting portion protrudes from the second main body in the second direction. The fourth connecting portion is received in the third connecting portion and fixedly connected to the third connecting portion.

The first main body and the second main body each are formed as a C-shaped structure; or the first main body and the second main body each are formed as a L-shaped structure.

The present disclosure further provides a battery module, which comprises a plurality of batteries and the buffering member described above, and the buffering member is provided between two adjacent batteries.

The present disclosure has the following beneficial effects: in the buffering member, because the first member and the second member are independent members, and both of them can be respectively formed by separately cutting a sheet. Moreover, because the first member and the second member each are small in size and simple in structure, and both of them can be rapidly formed by using less material, the whole structure of the buffering member is simple and the buffering member uses less material, thereby maximally improving the utilization rate of the sheet, and further reducing the cost and saving the resource. When the buffering member is applied to the battery module, because a hollow portion surrounded by the first member and the second member of the buffering member can release the swelling force generated by the battery in time, the buffering member satisfies the swelling force requirement of the battery, thereby ensuring the service life of the battery. Moreover, based on the elasticity of the first member and the second member themselves, the buffering member can also absorb the assembling tolerances between the batteries in the process of assembling, thereby maximally ensuring the whole assembling dimensional accuracy of the battery module.

Figure 1:
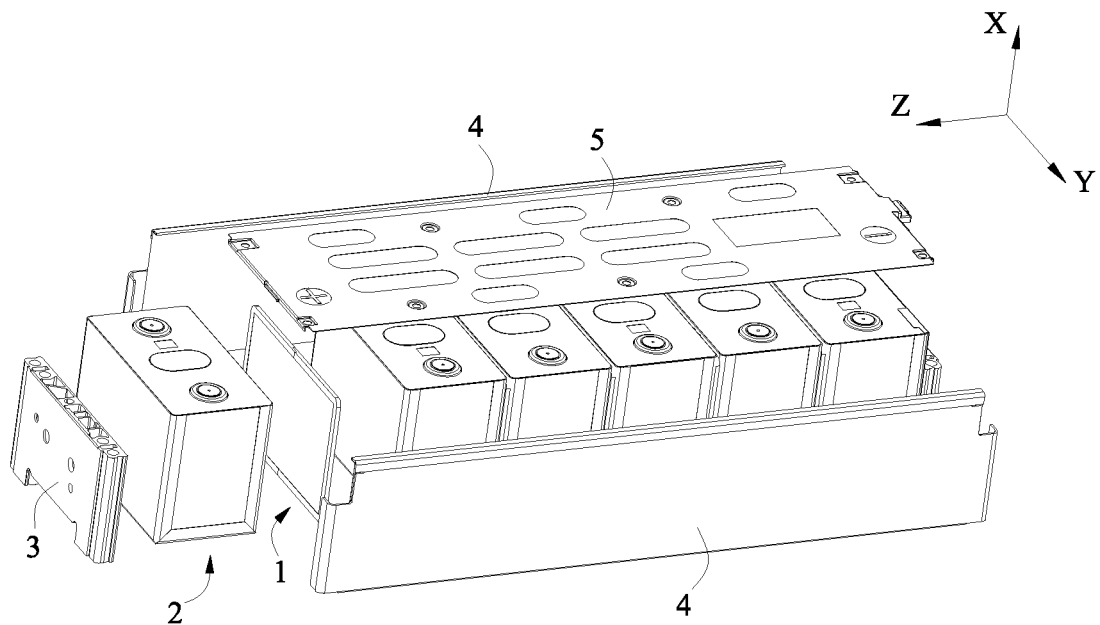
FIG. 1 is a perspective view of a battery module of the present disclosure.

Reference numerals in figures are represented as follows:
1 buffering member
  11 first member
    111 first main body
    112 first connecting portion
    113 third connecting portion
  12 second member
    121 second main body
    122 second connecting portion
    123 fourth connecting portion
2 battery
3 end plate
4 side plate
5 upper cover
X first direction
Y second direction
Z third direction

DETAILED DESCRIPTION

To make the object, technical solutions, and advantages of the present disclosure more apparent, hereinafter the present disclosure will be further described in detail in combination with the accompanying figures and the embodiments. It should be understood that the specific embodiments described herein are merely used to explain the present disclosure but are not intended to limit the present disclosure.

In the description of the present disclosure, unless otherwise specifically defined and limited, the terms "first", "second", "third" and the like are only used for illustrative purposes and are not to be construed as expressing or implying a relative importance; the term "plurality" means two or more; the terms "connect" and "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the person skilled in the art, the specific meanings of the abovementioned terms in the present disclosure can be understood according to the specific situation.

In the description of the present disclosure, it should be understood that spatially relative terms, such as "above", "below" and the like, are described based on orientations illustrated in the figures, but are not intended to limit the embodiments of the present disclosure. Hereinafter the present application will be further described in detail in combination with the figures.

Referring to FIG. 1, a battery module of the present disclosure comprises a buffering member 1, a plurality of batteries 2, an end plate 3, a side plate 4 and an upper cover 5. The plurality of batteries 2 are arranged side by side in a third direction Z, and the buffering member 1 is provided between the two adjacent batteries 2.

The end plate 3 is provided as two in number, and the two end plates 3 are respectively provided on two sides of the plurality of batteries 2 in the third direction Z. The side plate 4 is provided as two in number, and the two side plates 4 are respectively provided on two sides of the plurality of batteries 2 in a second direction Y. The end plates 3 and the side plates 4 are connected with each other (e.g., by welding) to clamp and fix the plurality of batteries 2 and the buffering members 1 provided between the two adjacent batteries 2. The upper cover 5 is positioned above the plurality of batteries 2 in a first direction X and fixedly connected to the end plate 3 and/or the side plate 4.

The buffering member 1 has elasticity and may be made of an elastic material, and the elastic material may be rubber, foam adhesive, plastic or the like. Referring to FIG. 2 to FIG. 14, the buffering member 1 comprises a first member 11 and a second member 12, the first member 11 and the second member 12 are spliced together and form a hollow frame structure.

The first member 11 may comprise a first main body 111 and a first connecting portion 112. The second member 12 may comprise a second main body 121 and a second connecting portion 122. The first main body 111 of the first member 11 and the second main body 121 of the second member 12 face each other in the second direction Y, and the first connecting portion 112 is cooperated with and fixedly connected to the second connecting portion 122, therefore the first member 11 and the second member 12 are spliced together and form the hollow frame structure.

In the buffering member 1, because the first member 11 and the second member 12 are independent members, and both of them can be respectively formed by separately cutting a sheet. Moreover, because the first member 11 and the second member 12 each are small in size and simple in structure, and both of them can be rapidly formed by using less material, the whole structure of the buffering member 1 is simple and the buffering member 1 uses less material, thereby maximally improving the utilization rate of the sheet, and further reducing the cost and saving the resource. When the buffering member 1 is applied to the battery module, because a hollow portion surrounded by the first member 11 and the second member 12 of the buffering member 1 can release the swelling force generated by the battery 2 in time, the buffering member 1 satisfies the swelling force requirement of the battery 2, thereby ensuring the service life of the battery 2. Moreover, based on the elasticity of the first member 11 and the second member 12 themselves, the buffering member 1 can also absorb the assembling tolerances between the batteries 2 in the process of assembling, thereby maximally ensuring the whole assembling dimensional accuracy of the battery module.

It should be noted that, in order to ensure that the dimensions of the buffering member 1 will not exceed the dimension range of the battery 2 when the buffering member 1 is pressed between the batteries 2, the dimensions of the buffering member 1 in the first direction X and the second direction Y may be reasonably determined respectively according to the height dimension and the width dimension of the battery 2, and the dimension of the buffering member 1 in the third direction Z may be calculated according to the assembling gap and the assembling preload of the battery 2 in the battery module.

Because the manner of bonding by a binder is simple, the first connecting portion 112 of the first member 11 and the second connecting portion 122 of the second member 12 may be fixedly connected to each other by bonding. Of course, it is not limited thereto, and both of them may also be fixedly connected to each other by other manners.

Figure 12:
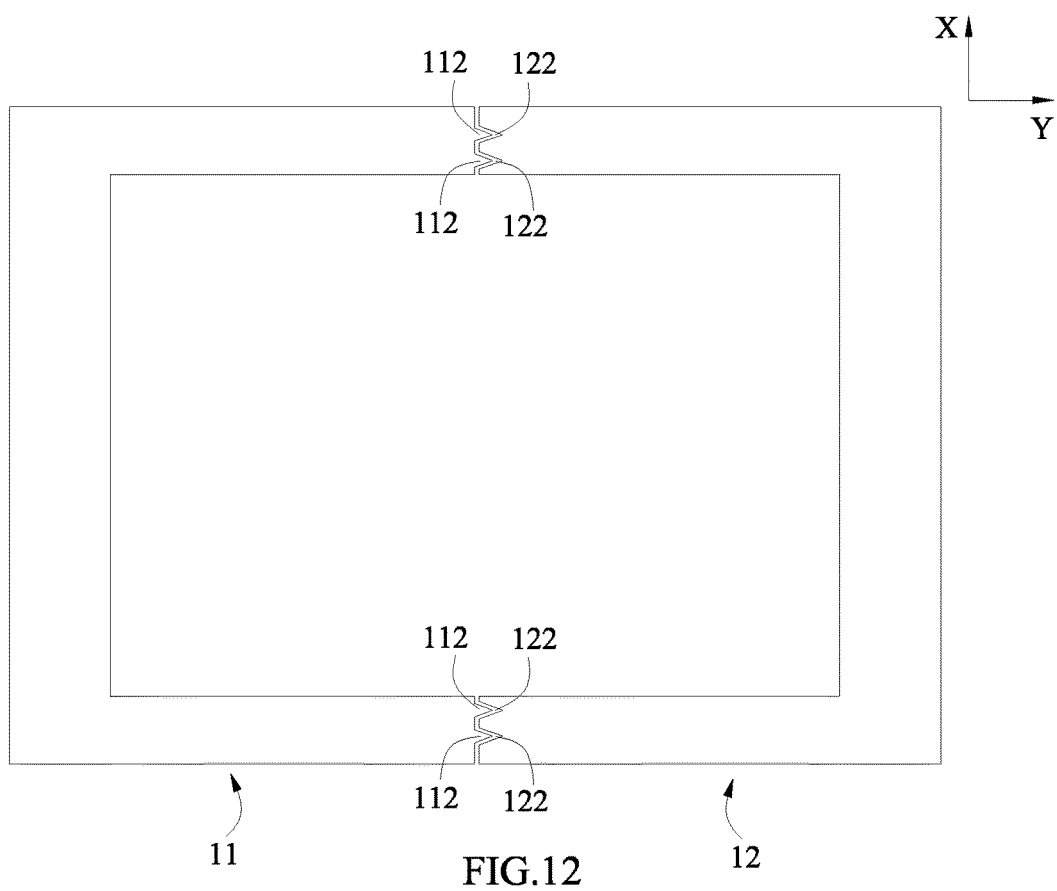
FIG. 12 is a fourth variation of FIG. 8.
Figure 13:
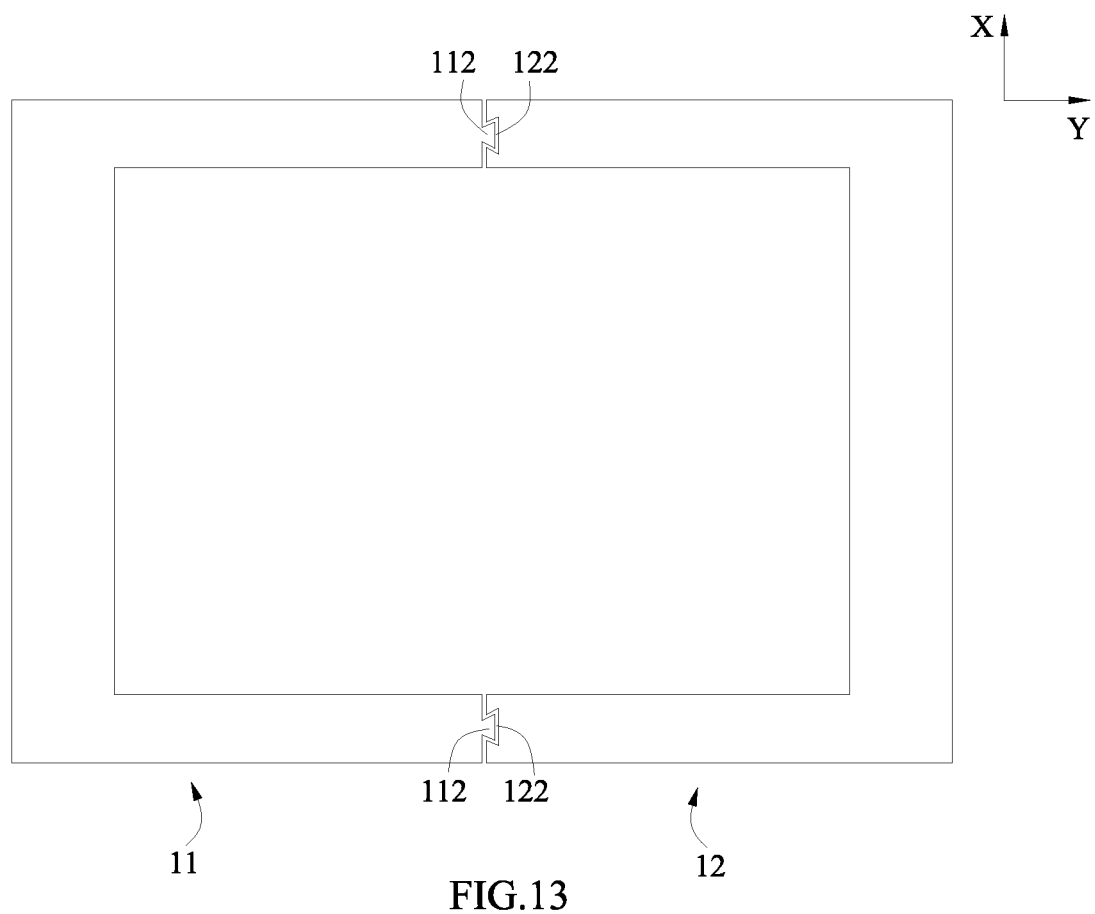
FIG. 13 is a fifth variation of FIG. 8.
Figure 14:
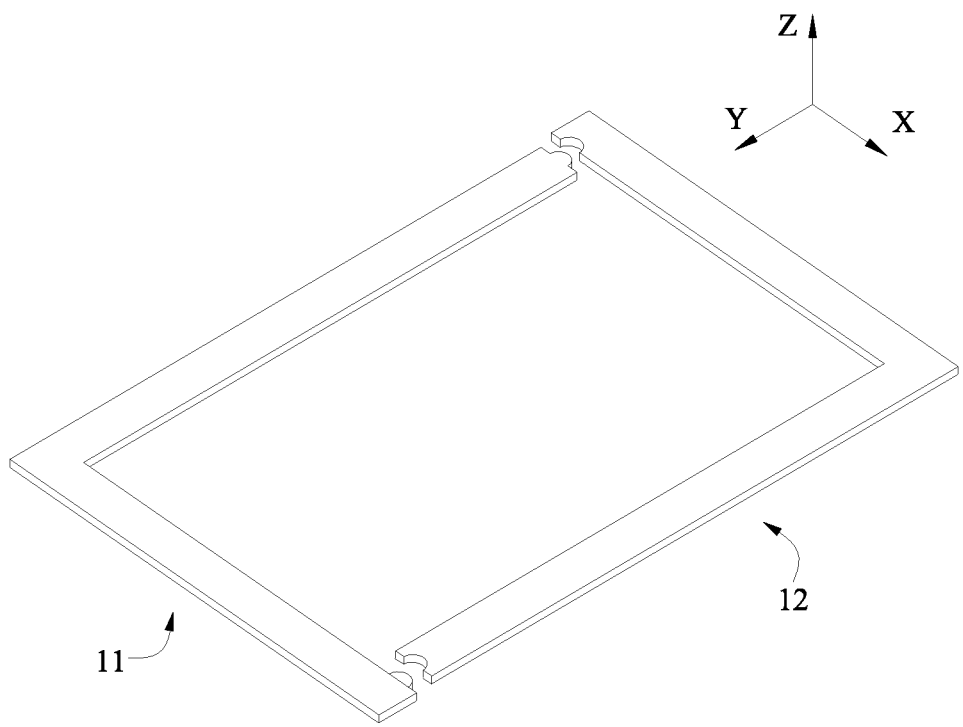
FIG. 14 is a perspective view a yet embodiment of the buffering member with the first member not completely assembled with the second member.

The first main body 111 of the first member 11 and the second main body 121 of the second member 12 each may be formed as a C-shaped structure (as shown in FIG. 2 to FIG. 13), or the first main body 111 and the second main body 121 each may be formed as a L-shaped structure (as shown in FIG. 14).

Preferably, in order to improve the structural consistency of the first member 11 and the second member 12, the contour dimensions of the first main body 111 (including the dimensions in the first direction X, in the second direction Y and in the third direction Z) are consistent with the contour dimensions of the second main body 121.

The first member 11 and the second member 12 of the buffering member 1 of the present disclosure will be described in detail below with different embodiments.

Figure 2:
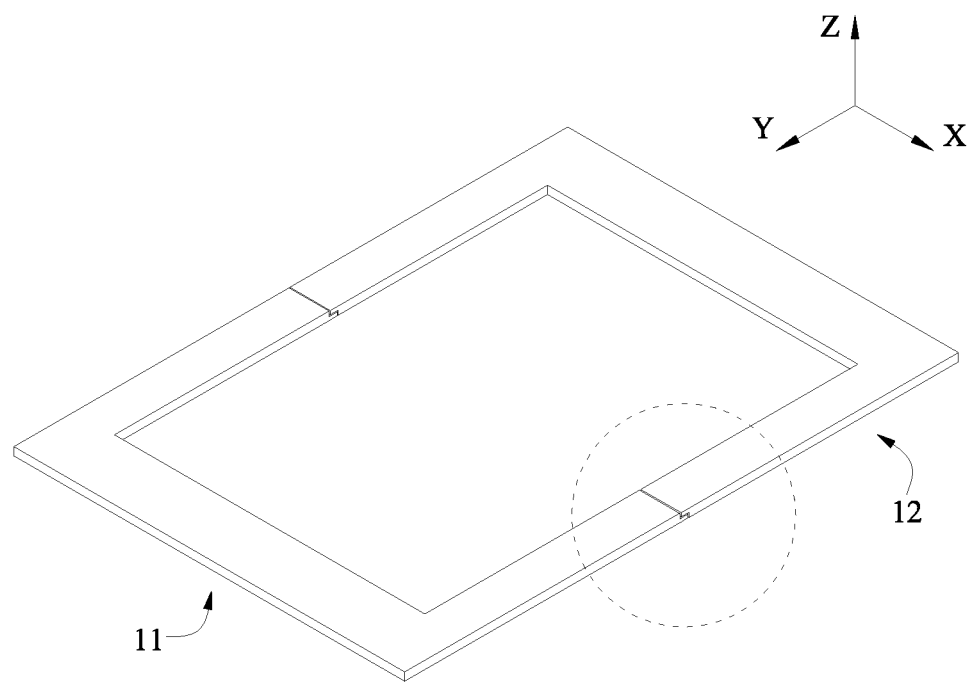
FIG. 2 is a perspective view of an embodiment of a buffering member with a first member not completely assembled with a second member.
Figure 3:
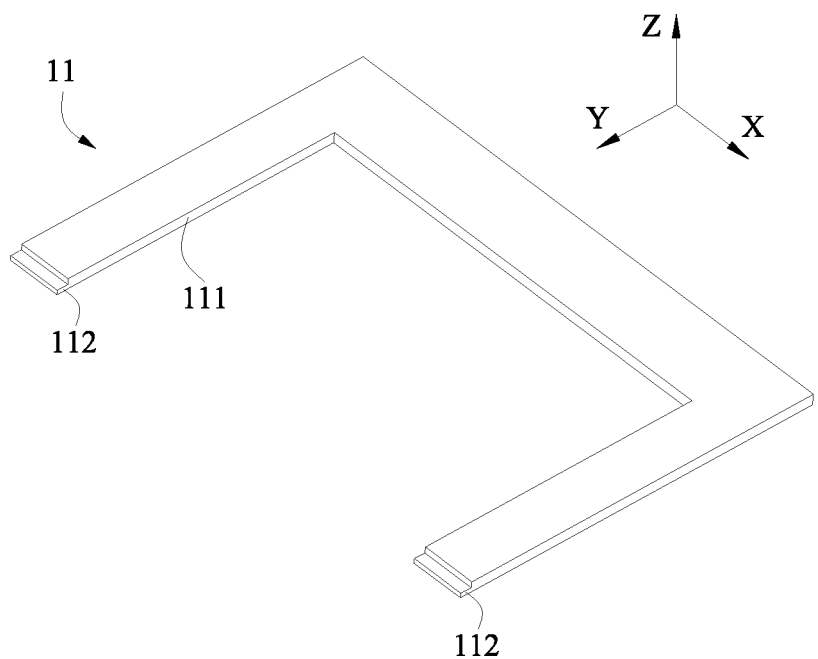
FIG. 3 is a perspective view of the first member of FIG. 2.
Figure 4:
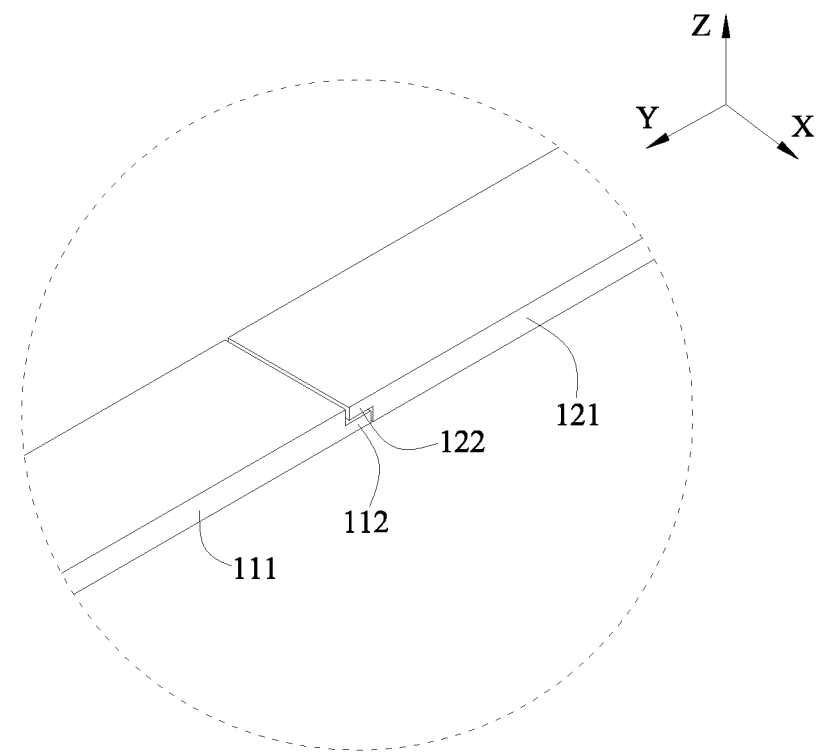
FIG. 4 is an enlarged view of FIG. 2 indicated by a circle part.
Figure 5:
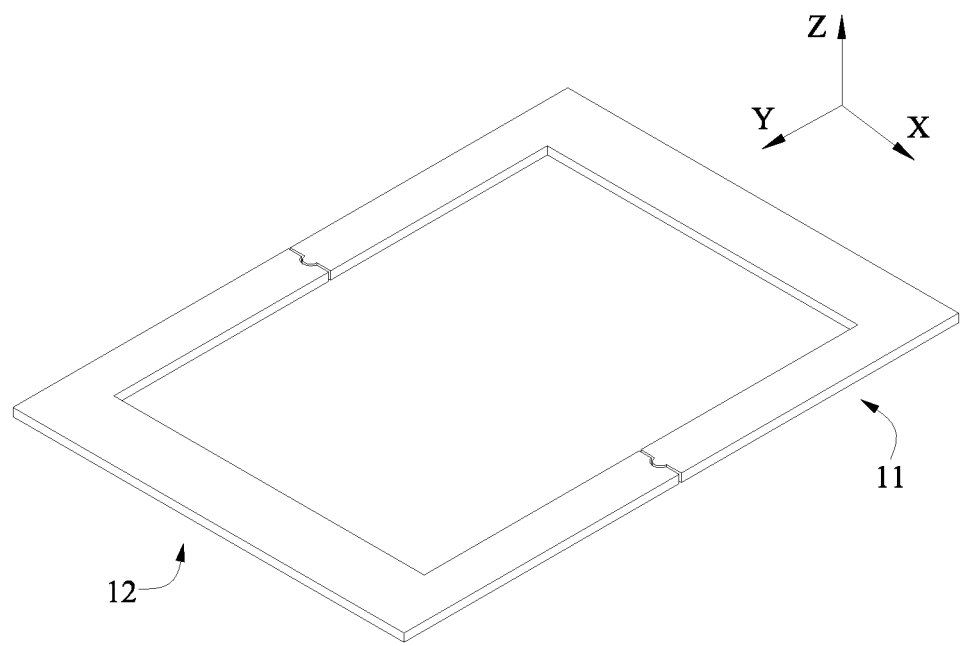
FIG. 5 is a perspective view another embodiment of the buffering member with the first member not completely assembled with the second member.
Figure 6:
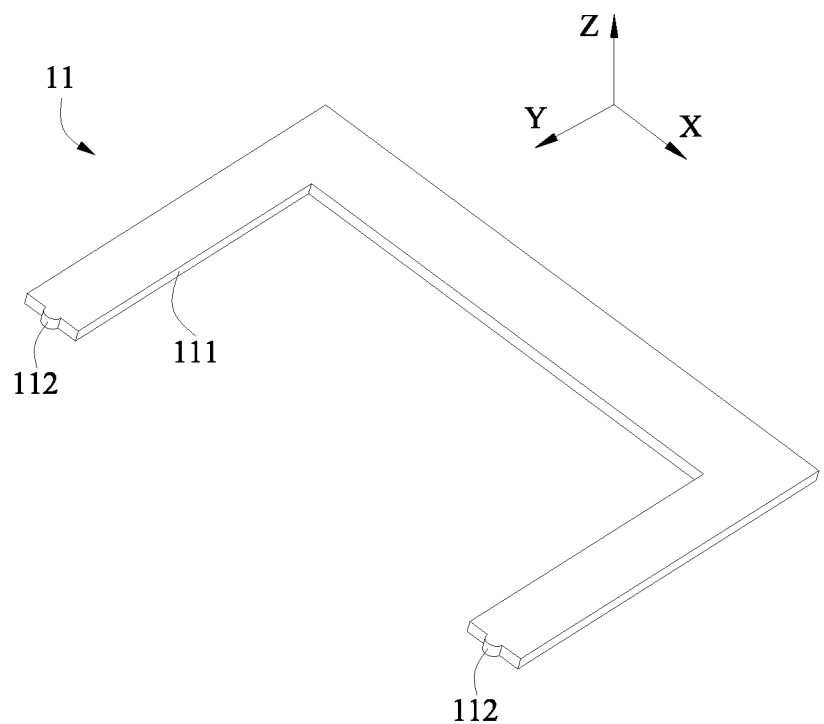
FIG. 6 is a perspective view of the first member of FIG. 5.
Figure 7:
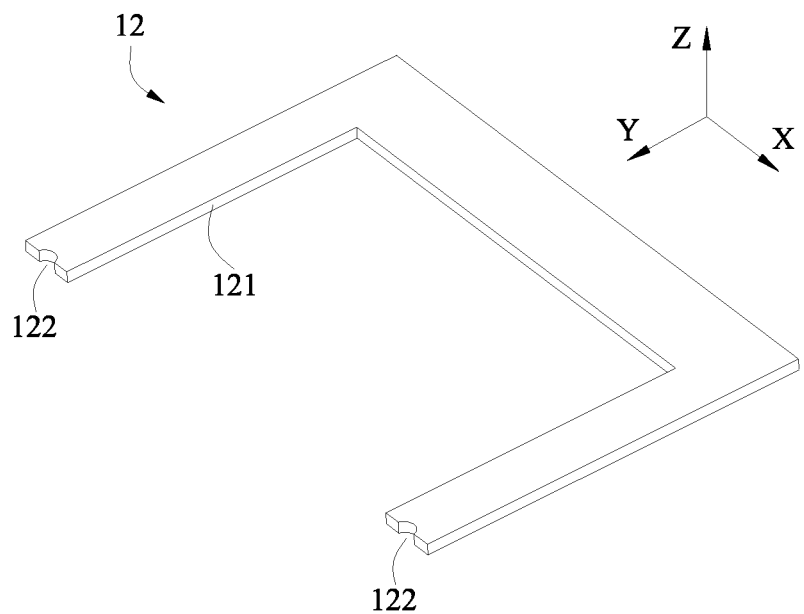
FIG. 7 is a perspective view of the second member of FIG. 5.
Figure 8:
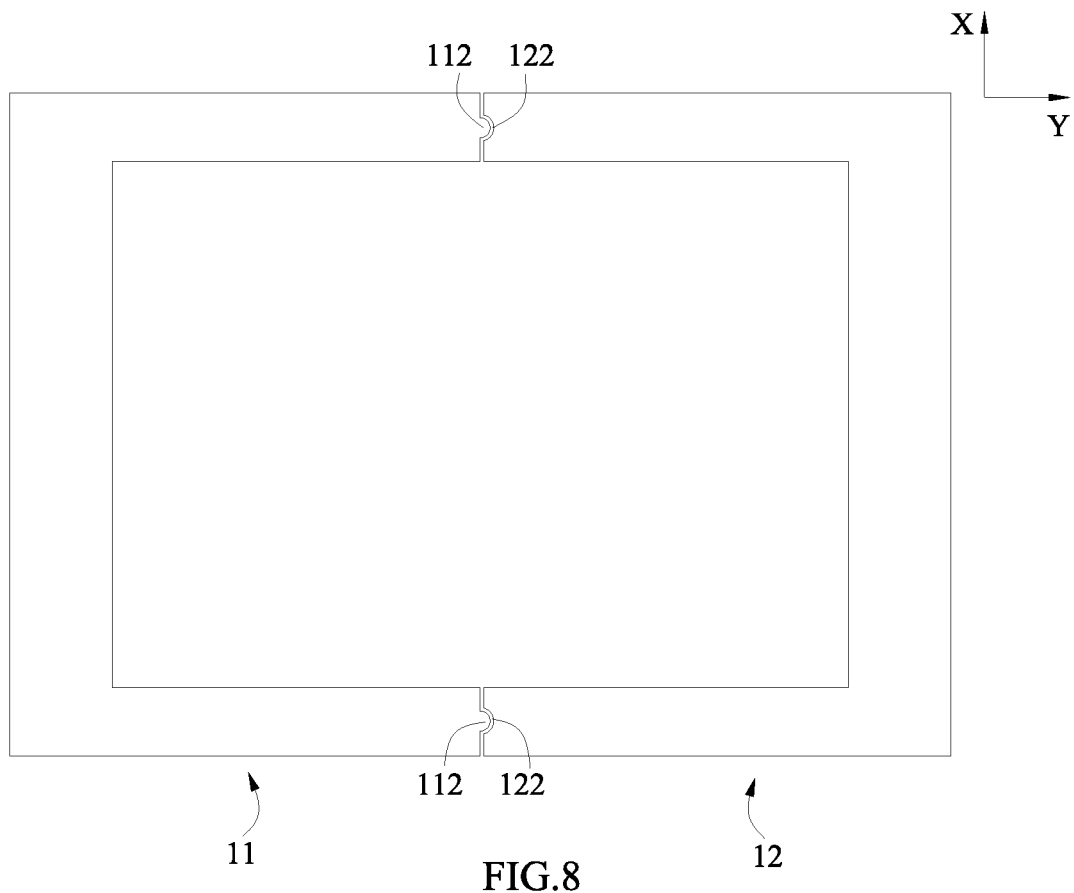
FIG. 8 is a front view of FIG. 5.

In a first embodiment, referring to FIG. 2 to FIG. 4, the first connecting portion 112 of the first member 11 protrudes from the first main body 111 in the second direction Y, and the second connecting portion 122 of the second member 12 protrudes from the second main body 121 in the second direction Y. The first connecting portion 112 and the second connecting portion 122 face each other in the third direction Z and are fixedly connected to each other (i.e., both of them attached to each other face to face in the third direction Z).

Because the first connecting portion 112 and the second connecting portion 122 each can be formed as a flat plate structure, and the structures of the first member 11 and the second member 12 are simple and easy to form, thereby improving the utilization rate of the sheet. Moreover, because the first connecting portion 112 and the second connecting portion 122 can be formed in the same structure, the first member 11 and the second member 12 can be formed in a structure that is completely identical in shape and dimension, thereby ensuring the processing consistency of the first member 11 and the second member 12, therefore the production process is simplified, and the forming efficiency of the first member 11 and the second member 12 is improved.

The surfaces of the first connecting portion 112 and the second connecting portion 122 facing each other in the third direction Z may be fixedly connected to each other by a binder. In order to further improve the bonding strength between the first member 11 and the second member 12, the first connecting portion 112 may abut against the second main body 121 in the second direction Y and be fixedly connected to the second main body 121 by the binder, the second connecting portion 122 may abut against the first main body 111 in the second direction Y and be fixedly connected to the first main body 111 by the binder. Here, because the first member 11 and the second member 12 simultaneously ensure the binder forces in the third direction Z and the second direction Y, the whole structural strength of the buffering member 1 is ensured.

Referring to FIG. 2 to FIG. 4, a width of the first connecting portion 112 in the first direction X may be equal to a width of the first main body 111 in the first direction X, and a width of the second connecting portion 122 in the first direction X may be equal to a width of the second main body 121 in the first direction X, therefore it not only ensures the bonding area of the first member 11 and the second member 12, but also ensures the structural consistency of the first member 11 and the second member 12 in the first direction X.

Referring to FIG. 2 to FIG. 4, a surface of the first connecting portion 112 in the third direction Z is flush with a surface of the first main body 111 in the third direction Z, and a thickness of the first connecting portion 112 in the third direction Z is less than a thickness of the first main body 111 in the third direction Z. Preferably, the thickness of the first connecting portion 112 in the third direction Z may be half of the thickness of the first main body 111 in the third direction Z, and a length of the first connecting portion 112 in the second direction Y may be 3-4 times a thickness of the first main body 111 in the third direction Z.

Similarly, a surface of the second connecting portion 122 in the third direction Z is flush with a surface of the second main body 121 in the third direction Z, and a thickness of the second connecting portion 122 in the third direction Z is less than a thickness of the second main body 121 in the third direction Z. Preferably, the thickness of the second connecting portion 122 in the third direction Z may be half of the thickness of the second main body 121 in the third direction Z, and a length of the second connecting portion 122 in the second direction Y may be 3-4 times a thickness of the second main body 121 in the third direction Z.

In a second embodiment, referring to FIG. 5 to FIG. 14, the first connecting portion 112 may protrude from the first main body 111 in the second direction Y, and the second connecting portion 122 may be recessed from a surface of the second main body 121 facing the first main body 111 in the second direction Y. The first connecting portion 112 is received in the second connecting portion 122 (i.e., the concave-convex fit) and fixedly connected to the second connecting portion 122.

Because the first connecting portion 112 and the second connecting portion 122 are concave-convex fitted, and such as concave-convex fit manner not only facilitates rapid positioning between the first connecting portion 112 and the second connecting portion 122, but also improves the cooperating area of the first connecting portion 112 and the second connecting portion 122, thereby improving the bonding strength of the first member 11 and the second member 12 when the first connecting portion 112 and the second connecting portion 122 are fixedly connected to each other by the binder.

In order to further improve the bonding strength between the first member 11 and the second member 12, the second main body 121 may abut against the first main body 111 in the second direction Y and be fixedly connected to the first main body 111 by the binder.

The first connecting portion 112 may be provided at two sides of the hollow portion surrounded by the first member 11 and the second member 12 in the first direction X, and the first connecting portion 112 at the same side of the hollow portion in the first direction X may be provided as one or more in number. Similarly, the second connecting portion 122 may be provided at two sides of the hollow portion surrounded by the first member 11 and the second member 12 in the first direction X, and the second connecting portion 122 at the same side of the hollow portion in the first direction X may be provided as one or more in number.

When the first connecting portion 112 and the second connecting portion 122 on the same side of the hollow portion in the first direction X each are provided as one in number, the structures of the first member 11 and the second member 12 are simple, and they are convenient for formation and easy for automated manufacturing. When the first connecting portion 112 and the second connecting portion 122 on the same side of the hollow portion in the first direction X each are provided as multiple in number, the cooperating area of the first connecting portions 112 and the second connecting portions 122 is increased, thereby improving the bonding strength of the first member 11 and the second member 12 when the first connecting portions 112 and the second connecting portions 122 are fixedly connected to each other by the binder.

Specifically, referring to FIG. 5 to FIG. 10, projections of the first connecting portion 112 and the second connecting portion 122 in the third direction Z each may be semicircular (i.e., the first connecting portion 112 is formed as a semi-cylindrical convex structure, and the second connecting portion 122 is formed as a semi-cylindrical concave structure). Here, because the surfaces of the first connecting portion 112 and the second connecting portion 122 facing each other each are formed as a curved-surface structure, the cooperating area of the first connecting portion 112 and the second connecting portion 122 is increased, thereby improving the bonding strength of the first member 11 and the second member 12 when the first connecting portion 112 and the second connecting portion 122 are fixedly connected to each other by the binder.

A radius of the first connecting portion 112 is equal to a radius of the second connecting portion 122. Preferably, the radius of the first connecting portion 112 is equal to the thickness of the first main body 111 in the third direction Z. Correspondingly, the radius of the second connecting portion 122 is equal to the thickness of the second main body 121 in the third direction Z.

Figure 11:
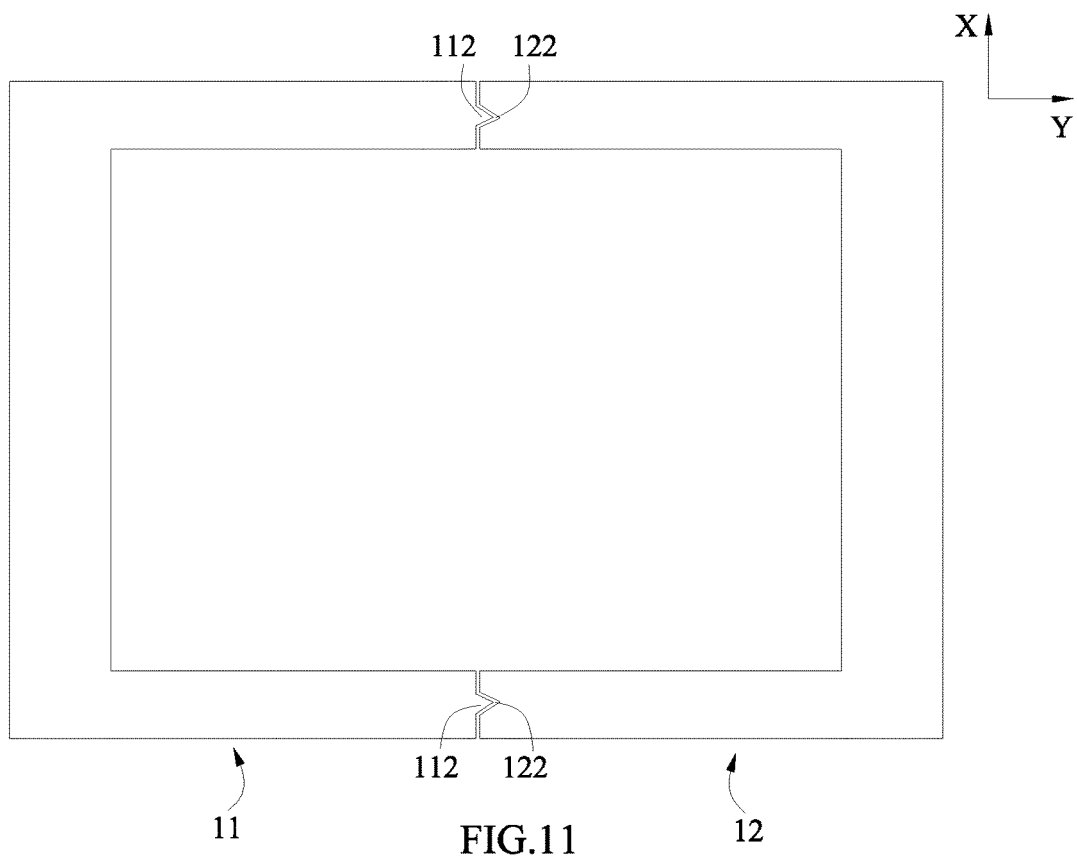
FIG. 11 is a third variation of FIG. 8.

Referring to FIG. 11 and FIG. 12, projections of the first connecting portion 112 and the second connecting portion 122 in the third direction Z each may be triangular. The width of the first connecting portion 112 in the first direction X is equal to the width of the second connecting portion 122 in the first direction X. Preferably, the width of the first connecting portion 112 in the first direction X is equal to the thickness of the first main body 111 in the third direction Z. Correspondingly, the width of the second connecting portion 122 in the first direction X is equal to the thickness of the second main body 121 in the third direction Z.

Referring to FIG. 13, projections of the first connecting portion 112 and the second connecting portion 122 in the third direction Z each may be trapezoidal. Here, because two oblique sides of the trapezoidal structure extend obliquely, the cooperating area of the first connecting portion 112 and the second connecting portion 122 is increased, thereby improving the bonding strength of the first member 11 and the second member 12 when the first connecting portion 112 and the second connecting portion 122 are fixedly connected to each other by the binder.

Preferably, a width of a narrow side of the first connecting portion 112 in the first direction X is equal to the thickness of the first main body 111 in the third direction Z. Correspondingly, the width of the narrow side of the second connecting portion 122 in the first direction X is equal to the thickness of the second main body 121 in the third direction Z.

In a third embodiment, in order to simplify the description, only the difference between the third embodiment and the second embodiment will be mainly described below, and the content which is not described can be understood with reference to the second embodiment.

The difference between the third embodiment and the embodiment lies in that, the first member 11 further comprises a third connecting portion 113, and the second member 12 further comprises a fourth connecting portion 123.

Figure 9:
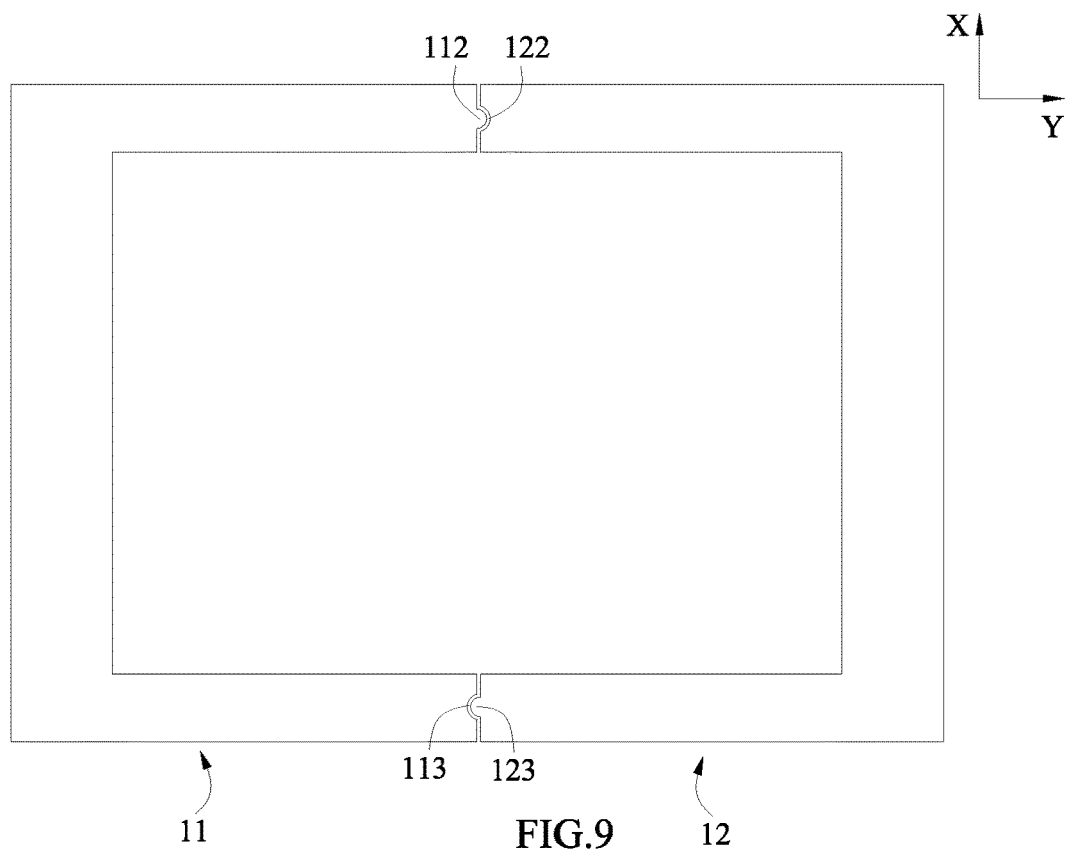
FIG. 9 is a first variation of FIG. 8.
Figure 10:
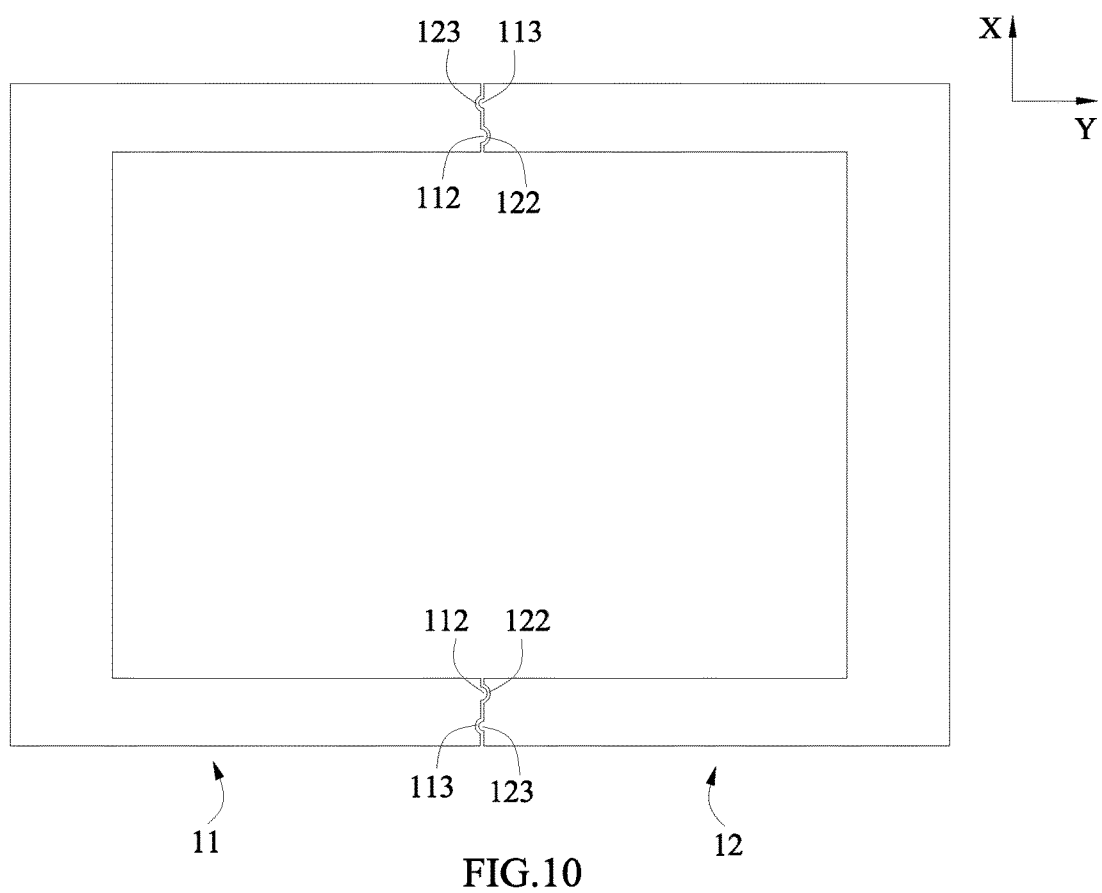
FIG. 10 is a second variation of FIG. 8.

Referring to FIG. 9 and FIG. 10, the third connecting portion 113 is recessed from the surface of the first main body 111 facing the second main body 121 in the second direction Y, and the fourth connecting portion 123 protrudes from the second main body 121 in the second direction Y. The fourth connecting portion 123 is received in the third connecting portion 113 and fixedly connected to the third connecting portion 113.

Because the first connecting portion 112 and the third connecting portion 113 are respectively provided on two sides of the hollow portion surrounded by the first member 11 and the second member 12 in the first direction X, the second connecting portion 122 and the fourth connecting portion 123 are respectively provided on two sides of the hollow portion surrounded by the first member 11 and the second member 12 in the first direction X, and the first connecting portion 112 and the fourth connecting portion 123 can be formed in the same structure, the third connecting portion 113 and the second connecting portion 122 can be formed in the same structure, the first member 11 and the second member 12 can be formed in a structure that are completely identical in shape and dimension, thereby ensuring the processing consistency of the first member 11 and the second member 12, therefore the production process is simplified, and the forming efficiency of the first member 11 and the second member 12 is improved.

What is claimed is:

1. A battery module, comprising a plurality of batteries and a plurality of buffering members, the plurality of batteries being arranged side by side in a third direction of the battery module, and each buffering member wholly being provided between a respective pair of two adjacent batteries in the third direction, wherein
    each buffering member comprises a first member and a second member;
    the first member comprises a first main body and a first connecting portion;
    the second member comprises a second main body and a second connecting portion;
    the first main body of the first member forms a first opening at the first connecting portion, and the second main body of the second member forms a second opening at the second connecting portion, the first opening and the second opening face each other in a plane which is positioned between a corresponding pair of adjacent batteries, and the first connecting portion is cooperated with and fixedly connected to the second connecting portion, so that the first member and the second member are spliced together in the plane and form a hollow frame structure.

2. The battery module according to claim 1, wherein
    the first connecting portion protrudes from the first main body in a second direction;

the second connecting portion protrudes from the second main body in the second direction;

the first connecting portion and the second connecting portion face each other in the third direction and are fixedly connected to each other.

3. The battery module according to claim 2, wherein the first connecting portion abuts against the second main body in the second direction and is fixedly connected to the second main body;

the second connecting portion abuts against the first main body in the second direction and is fixedly connected to the first main body.

4. The battery module according to claim 2, wherein a width of the first connecting portion in a first direction is equal to a width of the first main body in the first direction;

a width of the second connecting portion in the first direction is equal to a width of the second main body in the first direction.

5. The battery module according to claim 1, wherein the first connecting portion protrudes from the first main body in a second direction;

the second connecting portion is recessed from a surface of the second main body facing the first main body in the second direction;

the first connecting portion is received in the second connecting portion and fixedly connected to the second connecting portion.

6. The battery module according to claim 5, wherein the second main body abuts against the first main body in the second direction and is fixedly connected to the first main body.

7. The battery module according to claim 5, wherein projections of the first connecting portion and the second connecting portion in the third direction each are semicircular; or projections of the first connecting portion and the second connecting portion in the third direction each are triangular; or projections of the first connecting portion and the second connecting portion in the third direction each are trapezoidal.

8. The battery module according to claim 5, wherein the first member further comprises a third connecting portion, and the third connecting portion is recessed from a surface of the first main body facing the second main body in the second direction;

the second member further comprises a fourth connecting portion, and the fourth connecting portion protrudes from the second main body in the second direction;

the fourth connecting portion is received in the third connecting portion and fixedly connected to the third connecting portion.

9. The battery module according to claim 1, wherein the first main body and the second main body each are formed as a C-shaped structure; or the first main body and the second main body each are formed as a L-shaped structure.

* * * * *